United States Patent [19]

Good et al.

[11] Patent Number: 5,353,474
[45] Date of Patent: Oct. 11, 1994

[54] TRANSFERRABLE PERSONALIZED GRIP FOR A HANDLE ASSEMBLY AND METHOD FOR MAKING SAME

[76] Inventors: Wayne T. Good, 4440 Walton Blvd., Waterford, Mich. 48329; Albert C. DeClerck, 3124 S. Adams Rd., Auburn Hills, Mich. 48326; Harold F. Burden, 629 S. Edgeworth, Royal Oak, Mich. 48967; John A. Watson, 2253 Equestrian Ct., Lapeer, Mich. 48446

[21] Appl. No.: 110,378

[22] Filed: Aug. 23, 1993

Related U.S. Application Data

[63] Continuation-in-part of Ser. No. 877,665, May 1, 1992, abandoned.

[51] Int. Cl.⁵ .............. A47B 95/02; A47J 45/10; B65D 25/28; E05B 1/00
[52] U.S. Cl. .............. 16/111 R; 16/114 R
[58] Field of Search .............. 16/114 R, 111 R; 173/169

[56] References Cited

U.S. PATENT DOCUMENTS

| | | |
|---|---|---|
| 412,479 | 10/1889 | Davis . |
| 1,980,087 | 12/1932 | Rast . |
| 2,205,769 | 6/1940 | Sweetland . |
| 2,222,336 | 11/1940 | Domellof .............. 16/114 R |
| 2,425,245 | 8/1947 | Johnson .............. 16/114 R |
| 3,037,783 | 6/1962 | Schlidt et al. . |
| 3,072,955 | 1/1963 | Mitchell . |
| 4,509,228 | 4/1985 | Landsberger . |
| 4,599,920 | 7/1986 | Schmid . |
| 4,617,697 | 10/1986 | David . |
| 4,785,495 | 11/1988 | Dellis . |
| 4,844,177 | 7/1989 | Robinson et al. .............. 173/12 |
| 4,890,355 | 1/1990 | Schulton . |
| 4,934,024 | 6/1990 | Sexton . |
| 4,942,791 | 7/1990 | Stewart et al. . |
| 4,964,192 | 10/1990 | Marui . |

OTHER PUBLICATIONS

Brochure, Hold–It, Inc., Product Data Sheet, 1990, 4 pages.
Article, Wall Street Journal, Molding Tool Designs To Cause No Harm, Mar. 11, 1991.

*Primary Examiner*—Carmine Cuda
*Attorney, Agent, or Firm*—Harness, Dickey & Pierce

[57] ABSTRACT

A handle assembly includes a main body portion and a gripping portion. The gripping portion formed on a sleeve which is adapted to be removably frictionally returned on the main body portion of the handle assembly. The gripping portion is molded to include the contour of a hand of a specific user and can readily be transferred among various tools which are adapted to receive the sleeve.

13 Claims, 3 Drawing Sheets

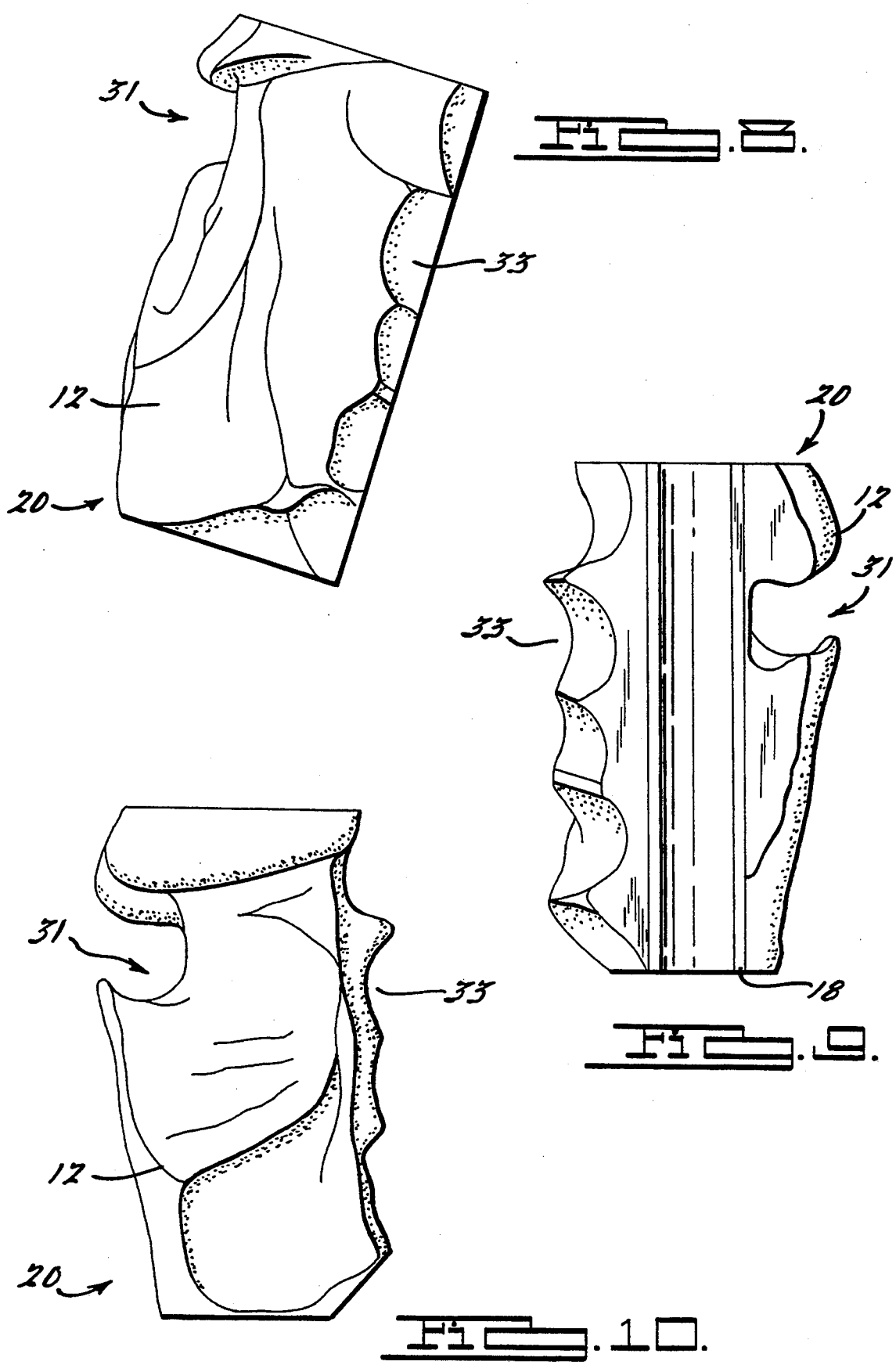

they handles either with soft surfaces, or of a moldable material to allow the operator to create a personalized grip to fit comfortably within the operator's hand.

TRANSFERRABLE PERSONALIZED GRIP FOR A HANDLE ASSEMBLY AND METHOD FOR MAKING SAME

CROSS-REFERENCE TO RELATED APPLICATION

This application is a continuation-in-part of pending patent application, Ser. No. 07/877,665 filed May 1, 1992, now abandoned.

FIELD OF THE INVENTION

The present invention in general relates to hand held tools. More particularly, the present invention relates to a handle assembly and a method of making a handle assembly for a hand held tool which includes a transferable personalized grip.

BACKGROUND OF THE INVENTION

In manufacturing and assembly facilities, such as automotive assembly facilities, for example, a production or assembly line may have scores of work stations each of which utilize one or more hand tools, such as pneumatic or electric motor screw drivers, nut tightening socket tools, or drills, for example.

During a normal shift, a worker may repetitively operate a tool hundreds of times. As a result, significant stresses and strains on the muscles, tendons and ligaments on a worker's arms and hands may result. Many studies have been conducted regarding an ailment identified as carpal tunnel syndrome and a great deal of research has been conducted on the linkage between the stress and strain a worker is subject to during operation of these hand tools and this carpal tunnel syndrome. Severe cases of carpal tunnel syndrome require surgery to decompress the carpal tunnel and relieve pressure on the median nerve. During post operative recovery from carpal tunnel syndrome surgery, use of a patient's hands may be severely limited for extended periods of time.

Many of the tools used in manufacturing and assembly facilities are generally in the shape of a pistol and include a handle portion depending from a motor-tool portion. The handle includes an index finger operated trigger for allowing the power source, usually pressurized air, to be admitted to the lower portion of the handle and traverse up through the handle to a motor, and thence from the motor back through the handle to an exhaust at the lower end again.

Manually, the handles are designed to accept the hand of most customers, and some have been provided with a non-flexible, rigid contour suitable for a wide variety of hand sizes. This is not at all satisfactory in view of the wide varieties of hand sizes.

Modern manufacturing and assembly facilities, such as automobile plants, often require workers to rotate among different stations to perform different tasks with different tools. Boredom by the workers is somewhat alleviate through frequent assignment rotation. Furthermore, cross training of workers to perform multiple tasks allows for decreased headcount and reduced downtime since idle workers can be moved to points of need resultant from increased demand or absenteeism. Thus, a need exists for a system of tools which perform different utilitarian functions that is adapted to receive a removable handle assembly formed to the hand of a specific user.

In an effort to relieve the harshness of the operation of these tools, attempts have been made to produce

INFORMATION DISCLOSURE STATEMENT—1449

One of the earliest illustrations of the use of a deformable material to produce a handle for tools is shown in U.S. Pat. No. 412,479 to Davis. The device in Davis uses a dental vulcanire material, capable of being molded to a particular shape, when appropriately softened, by being firmly gripped by the operator or user of the tool.

U.S. Pat. No. 4,890,355 to Schulton discloses a releasably mountable hand grip adapted to be mounted to a handle associated with a plastic bag, a tote bag, collapsible luggage, a briefcase or the like.

U.S. Pat. No. 4,934,024 to Sexton discloses a thermoplastic cover for tool handles, the cover being deformable at above ambient temperatures so as to receive a hand impression from the user.

U.S. Pat. Nos. 4,037,783 and 1,980,087 to Schlidt et al. and Rast respectively, show removable handles or grips usable with various tools.

Various other patents disclose moldable or removable handles for a variety of uses. These patents include U.S. Pat. Nos. 2,205,769 to Sweetland, 3,072,955 to Mitchell, 4,509,228 to Landsberger, 4,599,920 to Schmid, 4,617,697 to David, and 4,785,495 to Dellis.

Such known devices have proven to be an advance from traditional non-removable handle assemblies. However, none of these prior handle assemblies are without associated disadvantages. More specifically, some of the handle assemblies do not include personalized gripping portions. Further some of the handle assemblies do not include removable gripping portions. Additionally, none of the handle assemblies have personalized grips which can be functionally retained on and easily attached to and detached from any of a plurality of tools which perform various utilitarian tasks.

Accordingly, it is desired to provide a handle assembly for a hand held tool which includes a personalized gripping portion which can be removably attached to the handle of one tool so that the grip can be removed from such handle and be transferred to the handle on any one of a plurality of other tools.

SUMMARY OF THE INVENTION

It is the primary object of the present invention to provide a handle assembly which includes a gripping surface adapted to receive a hand of a specific user, the gripping surface being removably attached to a main body portion of the handle assembly. A related object of the present invention is to provide a system of tools, each tool being adapted to receive a transferable personalized grip.

Another object of the present invention is to provide a handle assembly which alleviates index finger fatigue and carpal tunnel inflammation.

Yet another object of the present invention is to provide a handle assembly having a trigger device which is constructed to prevent inadvertent actuation when the tool is being held in a lowered position between periods of operation.

Still a further object of the present invention is to provide a method of manufacturing a removable and transferable personalized grip for a hand tool.

The present invention achieves its objects and advantages, including those inherent therein, by providing a handle assembly for a hand tool of the type having a trigger actuated motor. The handle assembly comprises a main body portion, and a removable member. The main body portion has an upper end and a lower end, the lower end being adapted for communication with a power supply. The removable member is adapted to removably attach to the main body portion and includes a gripping portion and a sleeve portion. The gripping portion is specifically formed to receive a hand of a specific user. The sleeve portion has a substantially U-shaped cross section with an open side and includes first and second substantially parallel sides. This configuration permits the removable member to be forced onto said main body portion in a direction substantially normal to the open side. The removable member is removable as a unit for transfer to another hand tool and is adapted to attach and detach to the main body portion without interfering with an associated power supply.

The present invention also achieves its objects and advantages by the steps of forming a hand impression having an outer surface conforming with the hand of a specific user by grasping a malleable material, inserting the hand impression into a cavity of a mold, filling the cavity with a first curable material, curing the curable material around the hand impression, removing the hand impression, inserting a sleeve into the void left by the removal of the hand impression, injecting a second material into the void, curing the second curable material, and removing the sleeve.

BRIEF DESCRIPTION OF THE DRAWINGS

Other features and advantages of the present invention will be become apparent from the following description and appended claims, taken in conjunction with the accompanying drawings in which:

FIG. 8 is a right side plan view of the transferable gripping portion of the handle assembly of FIG. 1;

FIG. 9 is a front plan view of the transferable gripping portion of the handle assembly of FIG. 1; and FIG. 10 is a rear plan view of the transferable gripping portion of the handle assembly of FIG. 1.

DETAILED DESCRIPTION OF THE PREFERRED EMBODIMENTS

Figure 1:
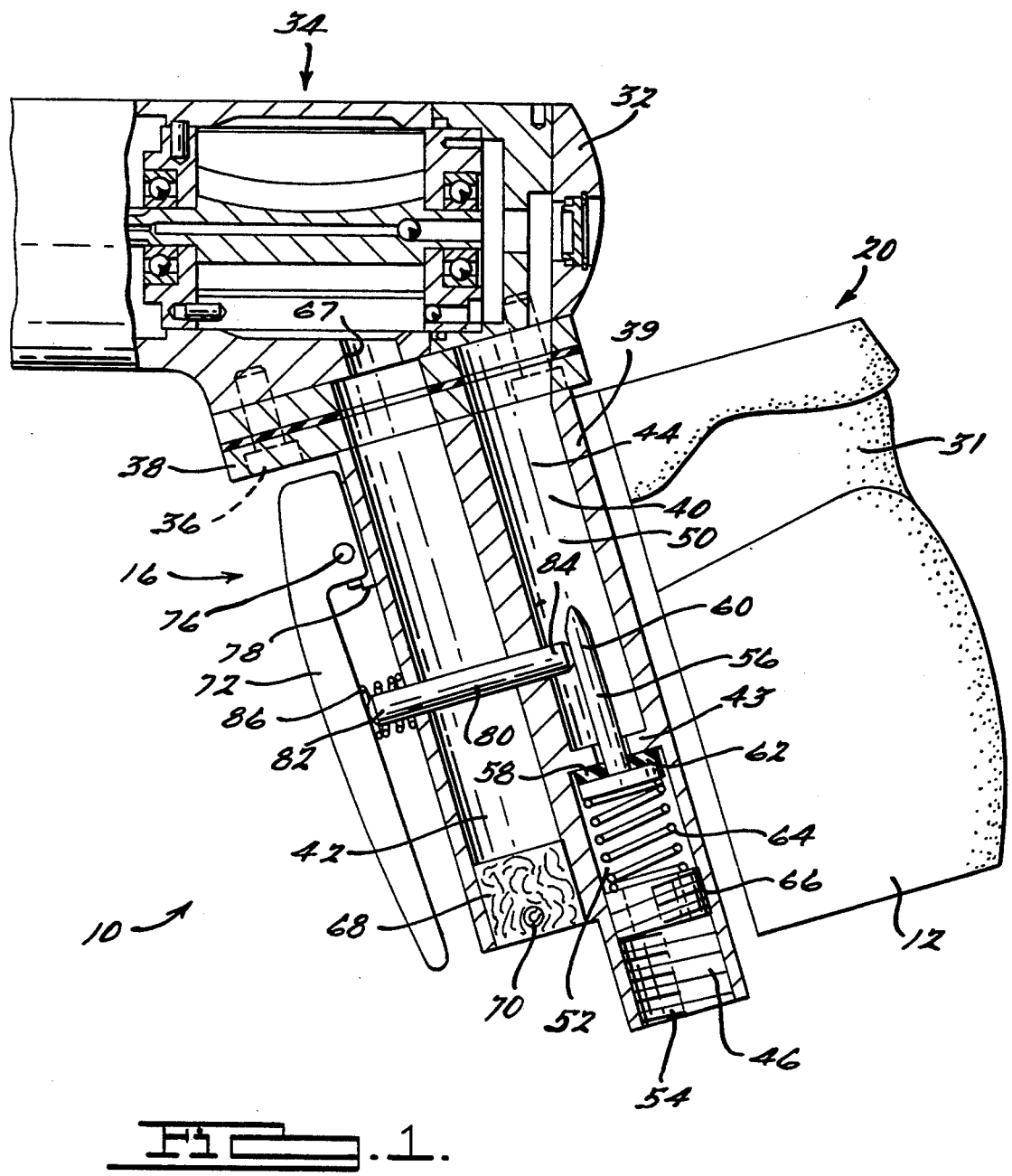
FIG. 1 is a partially exploded, partial sectional view of a handle assembly made in accordance with the teachings of the present invention.
Figure 2:
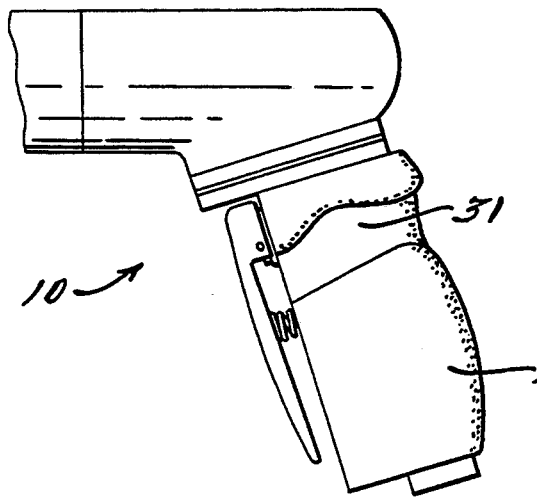
FIG. 2 is a side plan view of the handle assembly of FIG. 1.
Figure 3:
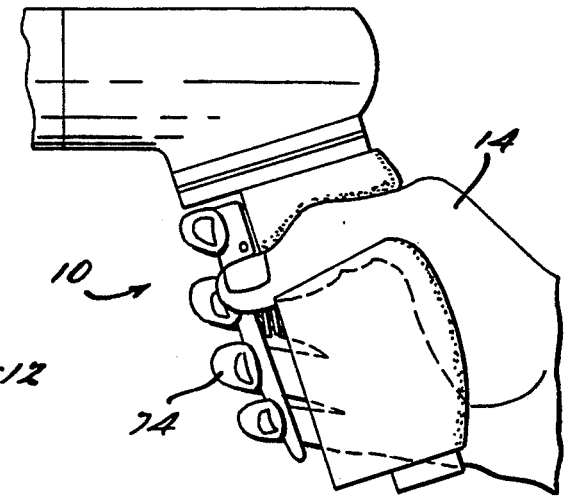
FIG. 3 is the handle assembly of FIG. 2 shown grasped by the hand of a user.

Referring to FIGS. 1 through 3, a handle assembly 10 constructed in accordance with the teachings of the present invention is illustrated. In accordance with one aspect of the present invention, the handle assembly 10 of the present invention includes a gripping surface 12 which is formed for a particular user's hand 14. A custom grip ensures that the palmar muscles, comprising the thenar and hypothenar eminences, are not significantly distorted from their natural shape when the handle assembly 10 is tightly gripped. It should be appreciated that the area of a human hand does not naturally conform to a cylindrical-like or rectangular-like shaft, particularly when tightly gripped by the thumb and fingers. With a personalized grip, such muscles are subjected to less strain, less pressure is applied to the median nerve, and resultantly, the hand as a whole undergoes less strain and fatigue from repetitive gripping cycles. Accordingly, the risk of developing carpal tunnel syndrome is decreased. As will be discussed in greater detail below, the gripping surface 12 of the handle assembly 10 of the present invention is produced from an impression which is taken from a particular user's hand 14 when in a substantially relaxed, or non-stressed state, thereby optimizing the contour for reducing fatigue and stress during repeated gripping cycles.

The illustrative embodiment of the present invention depicted throughout the drawings is particularly directed toward a handle assembly 10 which includes a gripping portion 12 adapted to receive a right hand 14. It will be appreciated by those skilled in the art that the teachings of the present invention are equally applicable to a similarly constructed device designed for operation with a left hand. Further, as will become apparent below, the present invention is readily adaptable to accommodate operation by a physically deformed hand.

Figure 4:
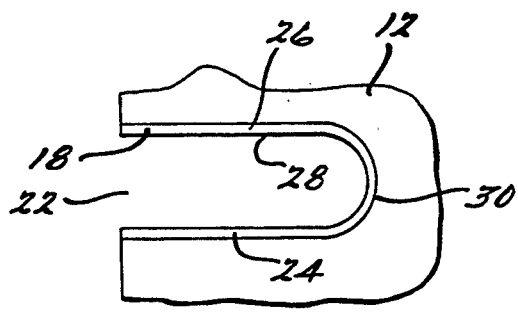
FIG. 4 is a top plan view of the transferable gripping portion of the handle assembly of FIG. 1.
Figure 5:
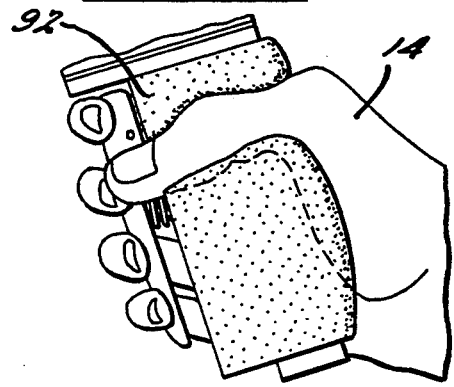
FIG. 5 is the sleeve of the present invention covered with a moldable material shown grasped by the hand of a user.

The handle assembly 10 of the present invention comprises a main body portion 16 and a sleeve 18 (see FIG. 4). The sleeve 18 and the gripping surface 12 cooperate to form a removable member 20. As will become more apparent below, the sleeve 18 is generally U-shaped in cross section and is adapted to be frictionally retained on the main body portion 16 of the handle assembly 10. In the preferred embodiment, the sleeve 18 tapers slightly inferiorly. The gripping surface 12 and the sleeve 18 cooperatively function to form a transferable personalized grip.

As shown in FIG. 4, the U-shaped cross section of the sleeve 18 provides a configuration having an open side 22, and first and second substantially parallel sides 24, 26. Preferably, the sleeve 18 is constructed of thin sheet metal or plastic material which is substantially form retaining, but sufficiently flexible to permit the sleeve 18 to be forced onto the main body portion 16 in a direction substantially normal to the open side 22.

The sleeve 18 includes an inner surface 28 and an outer surface 30. The inner surface 28 is at least partially defined by the first and second sides 24, 26, and is configured so as to permit the removable member 20 to be frictionally retained on the main body portion 16. More specifically, prior to attachment of the removable member 20, at least a substantial portion of the first and second sides 24, 26, are spaced apart a distance slightly less than necessary to functionally accommodate the main body portion 16. As the removable member 20 is forced onto the main body portion 16 in a direction substantially normal to open side 22 of the sleeve 18, the first and second sides 24, 26, or at least a substantial portion thereof, are forced slightly apart. The distance in which the first and second sides 24, 26 are forced apart is within the elastic range of deformation of the sleeve 18. Thus, the tendency for the sleeve 18 to return to its original configuration biases the removable member 20 to remain attached to the main body portion 16. Importantly, this configuration permits the removable member 20 to be quickly and easily removed as a unit for transfer to another hand tool (not shown).

Additionally, this configuration permits the removable member 20 to attach and detach to the main body portion 16 without interfering with any attached power supply cords or conduit (not shown). Furthermore, the U-shaped cross section provides a configuration which prevents rotation when the removable member 20 is attached to the main body portion 16.

The gripping surface 12 of the removable member 20 is preferably formed of a different material than the sleeve 18, and is permanently affixed thereto. However, it should be appreciated by those skilled in the art that a unitary construction forming a sleeve and gripping portion is not beyond the scope of the subject disclosure. The gripping surface 12 has an outer surface, which will be discussed in greater detail below, which is adapted to receive the portion of a hand of a specific user. As such, the gripping surface is generally U-shaped in cross section with a hand impression formed thereon. The hand impression is positioned so that the thumb impression, or thumb flute 31 is adjacent the first side 24 of the sleeve 18 and the finger impressions or finger flutes 33 are adjacent the second side 26 of the sleeve 18. When formed for a specific user, the gripping portion is sized so that it fits comfortably against the user's palm and the fingers extend substantially beyond the open side 22 of the sleeve 18.

The main body portion 16 of the handle assembly 10 includes a top end and a bottom end 21, 22 and is adapted to be securely fastened to a motor housing 32. The particular motor housing 32 illustrated serves to house a conventional motor 34 of the type associated with power tools such as screw drivers, nut tightening socket tools, drills, and the like, which are driven by a fluid, such as pressurized air. However, it will be appreciated by those skilled in the art that the handle assembly 10 of the present invention is readily adaptable for use with electrically driven motors. The main body 16 of the handle assembly 10 is attached to the motor housing 32 by any suitable means. In the preferred embodiment, screws 36 (shown in FIG. 1 in broken lines) pass through countersunk bores provided in a flange 38 formed at the top end 39 of the main body portion 16.

Referring specifically to FIG. 1, the main body portion 16 of the handle assembly 10 defines a fluid inlet channel 40 and an oppositely directed fluid outlet channel 42. The fluid inlet channel 40 and fluid outlet channel 42 each extending the length of the handle assembly 10 and are disposed parallel to one another.

The fluid inlet channel 40 has a top end 44 and a bottom end 46, and includes a toroidal-shaped flange 48 which divides the fluid channel into upper and lower chambers 50, 52. The bottom end 46 of the fluid inlet channel 40 is adapted to receive a source of power (not shown). To this end, in the exemplary embodiment illustrated, the bottom end 34 of the fluid inlet channel 30 includes internal threads 54 for connection to a source of pressurized air (not shown).

A tip valve 56 having a head portion 58 and a stem portion 60 is disposed within the fluid inlet channel 40, the head portion 58 being in the lower chamber 52 and the stem portion 60 passing through the toroidal-shaped flange 48 and extending into the upper chamber 50. A seal 62 is provided between the flange 48 and the head portion 58 of the tip valve 56 so as to prohibit fluid from passing from the lower chamber 52 to the upper chamber 50 when the tip valve 56 is seated, as shown in FIG. 1. A return spring 64, which is held in place by a retainer nut 66, serves to bias the tip valve 56 in such a seated position.

At the top end 39 of the main body portion 16, the upper chamber 50 is in fluid communication with the motor 34 to thereby provide a source of fluid (not shown). Further, at the top end 39 of the main body portion 16, the fluid outlet channel 42 is in fluid communication with an exhaust port 67 of the motor 34 to thereby receive the fluid which passes through the motor 34.

At the bottom end of the main body portion 16 an exhaust muffler 68 is provided in the fluid outlet channel 42. A pin 70 passes through the main body portion 16 and the exhaust muffler 68, thereby serving to retain the exhaust muffler 68.

The handle assembly 10 of the present invention further includes an elongated trigger lever 72 operative to unseat the tip valve 56, thereby permitting fluid to pass through the fuel inlet channel 40 and actuate the motor 34. The elongated trigger 72 is adapted to receive a plurality of fingers 74 of the hand 14 (see FIG. 3). The plurality of fingers 74 includes an index finger and at least one lower finger, i.e., middle finger, ring finger, and/or pinky finger.

To provide means for pivotally mounting the trigger 72 to the main body portion 16, the handle assembly further comprises a pivot pin 76 and bracket 78. The trigger lever 72 pivots about the pivot pin 76. The pivot pin 76 is supported by the bracket 78 in such a position that when the operator's hand grasps the handle assembly 10, the index finger is naturally placed around the trigger lever 72 at a point above the pivot pin 76 and the middle finger is placed around the trigger lever 72 below the pivot pin 76. The bracket 78 is attached to the exterior of the main body portion 16 of the handle assembly 10 with screws (not shown).

The significance of the particular location of the pivot pin 76 is twofold. First, carpal tunnel syndrome, which can be caused or aggravated by prolonged use of the index finger in a triggering motion, is reduced. In this regard, the trigger lever 72 of the present invention is operable to actuate the motor 34 with one or more fingers other than the index finger, preferably the lower three fingers in concert. Second, for increased safety, when the operator holds a hand tool incorporating the handle assembly 10 of the present invention with his or her arm in a relaxed state, i.e., hanging down, the motor 34 is not susceptible to accidental actuation. That is, the weight of the hand tool can be supported by the index finger opposing inadvertent actuation by the three lower fingers, i.e., the index finger biases the trigger lever 72 against the bias of the three other fingers and the lever is maintained in a position in which the motor 32 is not energized.

To provide means for actuating the motor 32, the main body portion 16 of the handle assembly 10 of the present invention further comprises a push rod 80 having first and second ends 82, 84, which is disposed substantially perpendicular to the longitudinal axis of the main body portion 16. A return spring 86 is securely affixed to the first end 82 of the push rod 80, thereby serving to bias the first end 82 of the push rod 80 adjacent the trigger lever 72. The second end 84 of the push rod 80 is disposed adjacent to the stem portion 60 of the tip valve 56. In the preferred embodiment, the push rod 80 is disposed below the pivot pin 76.

Referring to FIGS. 8 through 10, the transferrable removable portion 20 is illustrated in greater detail. The grippable portion 12 is custom fit to substantially identically fit the hand of a particular user. In this regard, the grippable portion 12 is formed to include the thumb flute 31 and finger flutes 33 thereby adapting the gripping portion 12 to be received by the hand 14 of a particular user.

By providing a custom grip, the user's muscles are subject to less strain and less pressure is applied to the median nerve since the hand need not distort significantly from its natural shape when the handle assembly 10 is tightly gripped. As a result, the hand as a whole and the arm undergo less strain and fatigue during extended periods of gripping. Accordingly, the risk of developing carpal tunnel syndrome is decreased.

Referring specifically to FIG. 4, the handle assembly 10 of the present invention is seen to comprise the U-shaped sleeve 18 which is adapted to be frictionally retained on the main body portion 16 of the handle assembly 10. The grippable portion 12 is securely attached to the U-shaped sleeve 18. The grippable portion 12 is formed from a rubber-like moldable material, such as, polyurethane, and is securely attached to the U-shaped sleeve 18 during a molding operation, which will be discussed in further detail below. Such a suitable material is commercially available from Minnesota Mining & Manufacturing Co. ("3M") as Devcon 80/80 Durometer.

It is intended that the main body portion 16 be incorporated into various tools that perform a wide variety of utilitarian tasks throughout a manufacturing facility. Thereby, a worker possessing a single personalized removable member 20 could be rotated throughout the manufacturing facility. Resultantly, the worker will be subject to less stresses and strains.

In accordance with another aspect of the present invention, a tool system adapted to interchangeably accommodate the hands of various users is provided. The system of the present invention comprises a plurality of tools, each of the tools having a handle assembly 10 comprising a main body portion 16, at least one gripping surface 12, and means for detachably mounting the gripping surface 12 to the main body portion 16 of each of the handle assemblies 10. To provide means for detachably mounting the gripping surface 12 to the main body portion 16 of each handle assembly 10, the U-shaped sleeve 18 is provided which is adapted to be frictionally retained on any of the main body portions 16. The system of the present invention allows a manufacturing or assembly facility, such as an automotive assembly facility, to provide multiple tools at various locations throughout the facility, each of which are adapted to be received by any one of a number of sleeves 18 which incorporate personalized grips. Thus, any worker that is provided with such a personalized transferrable grip 20 may move from station to station and use various different types of tools retaining a personalized transferrable single grip 20 for all the tools.

The method for manufacturing a handle assembly 10 for a hand tool of the present invention will now be described with reference to FIGS. 5 through 8. Briefly, the method comprises forming a hand impression in a pliable material 92, such as a dental impression material, which is disposed on a temporary sleeve 18'. A suitable material is commercially available from Kerr Corporation under the tradename Citricon. Temporary sleeve 18' is substantially identical to the sleeve 18. The sleeve 18' is slipped on a tool handle, and the operator grips the pliable material 92 to form the hand impression. The method further includes inserting the sleeve 18' into a cavity 94 of a mold 96, filling the cavity 94 with a material 98 capable of assuming a set condition, such as a silicone mold material, for example. The material 98 is allowed to cure or set around the sleeve 18' and pliable material 92 for approximately 24 hours. Next the sleeve 18' is removed, thereby leaving a void defined by a surface 100 having a female image of the hand impression. After the material 98 is set and the sleeve 18' is removed, the sleeve 18 is inserted into the void, spacing the sleeve 18 a predetermined distance from the surface 100. Finally, the polyurethane is injected or otherwise introduced between the sleeve 18 and the surface 100, and allowed to set to thereby form the gripping surface 12. The gripping surface 12, when set, retains a degree of flexibility so as to feel soft to the user.

More specifically, in order to form a hand impression having an outer surface substantially conforming with a hand 14 of a specific user, the dental impression material 92 is attached to the sleeve 18'. However, it will be appreciated by those skilled in the art, that any material being similarly malleable can be substituted.

The hand 14 of an individual user grasps the sleeve 18', applying light pressure with fingers, thumb, and palm, thereby leaving a substantially exact impression of his or her hand 14. Preferably, the material 92 is sufficiently malleable so that the individual user can conform the material 92 to the impression of his hand through the exertion of minimal pressure. This allows an optimal impression to be formed since the muscles are relatively unstressed and undergo minimal distortion. Accordingly, the gripping surface 12 will be optimized for reducing fatigue and stress during grip periods. Depending on the malleability of the material 92, it may be desired to allow the particular user to use the sleeve 18' covered with the material 92 for a day or two.

Figure 6:
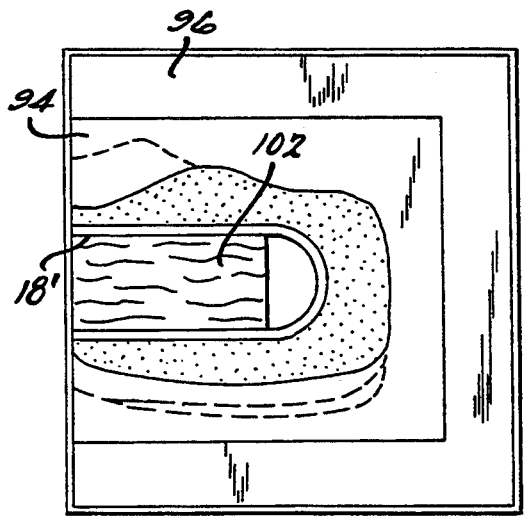
FIG. 6 is the sleeve of FIG. 5 shown inserted in a moldable material.
Figure 7:
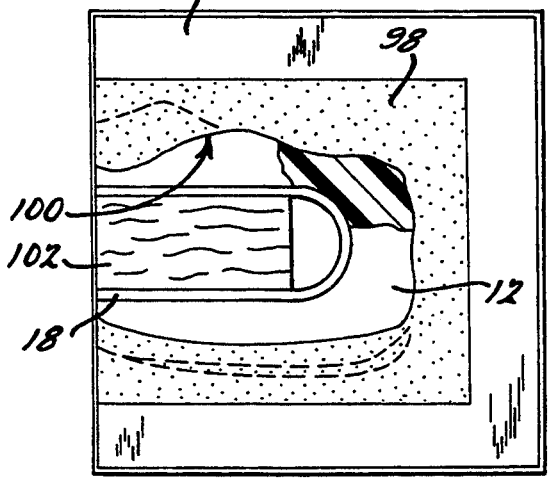
FIG. 7 is a partial sectional view of the mold of FIG. 6.

Referring to FIG. 6, once the material 92 has become sufficiently formed to include an impression of the user's hand, the sleeve 18' is placed into the mold 96 which has a cavity 94 larger in dimensions than the sleeve 18 and material 92. In the preferred method, the walls of the cavity 94 are treated with a suitable release agent. Further in the preferred method, a block 102, preferably constructed of wood, is securely attached to the mold 82. The block 102 has a width sufficient to fractionally retain the sleeves 18 and 18'. Next, the material 92 is introduced into the cavity 94 and cured or allowed to set. It will be appreciated by those skilled in the art, that alternatively, preforms of material can be placed along the walls of the cavity 80 before the sleeve 18' is inserted. Once the material 84 has cured, the sleeve 18' can be removed, thereby leaving the cured material 84 attached to the walls of the cavity 80, thus forming a void defined by a surface 86 in the form of a female image of the individual user's hand 14. In order to alleviate any sag of the material 84, it may be desired to line the walls of the cavity 80 with a perforated material, such as peg-board, prior to introduction of the material 84.

The U-shaped sleeve 18 is next treated with a bonding agent and placed within the cavity 80 on the block 88, thereby maintaining a substantially identical position relative to the surface 86. Next the polyurethane material 88 is injected into the cavity 80. Once the polyurethane material 88 is cured, it forms the gripping surface 12 which is permanently affixed to the U-shaped sleeve 18, having an exterior surface which conforms to the individual user's hand.

Although the present invention has been described in detail with reference to a certain preferred embodiment and a specific illustrative example, variations and modifications exist within the scope and spirit of the invention as described and as defined in the claims. For example, it will be readily appreciated by those skilled in the art that the present invention is equally applicable to hand held tools powered by an electrically driven motor. Also, the present invention can be constructed to accommodate handles which must be grasped with both hands. Such alternative constructions should fall clearly within the scope of this invention.

We claim:

1. A handle assembly for a hand tool of the type having a trigger actuated motor, said handle assembly comprising:

a main body portion having an upper end and a lower end and substantially parallel and substantially planar sides, said lower end adapted for communication with a power supply;

a removable member adapted to removably attach to said main body portion, said removable member including a gripping portion adapted to receive a hand of a specific user, and a substantially rigid sleeve portion having a substantially U-shaped cross section with an open side and including first and second substantially parallel and substantially planar sides adapted to be forced onto said substantially planar and substantially parallel sides of said main body portion in a direction substantially normal to said open side, said sleeve portion further having an inner surface at least partially defined by said first and second substantially parallel sides;

whereby said removable member is removable as a unit for transfer to another hand tool and is adapted to attach and detach to said main body portion without interfering with said power supply.

2. The handle assembly of claim 1, further comprising:

a bracket attached to said main body portion;

an elongated trigger adapted to receive a plurality of fingers of said hand; and a pin pivotally mounting said elongated trigger to said main body portion.

3. The handle assembly of claim 2, wherein said plurality of fingers includes an index finger, and further wherein said pin is located below said index finger when said gripping portion receives said plurality of fingers.

4. The handle assembly of claim 1, wherein said sleeve portion is substantially rigid but sufficiently deformable to elastically expand when forced onto said main body portion.

5. The handle assembly of claim 4, wherein said sleeve portion is metal.

6. A removable member for a hand tool of the type having a main body portion having an upper and a lower end and substantially parallel and substantially planar sides, said lower end adapted for communication with a power supply, and a trigger actuated motor, said removable member comprising:

a gripping portion adapted to receive a hand of a specific user; and a sleeve portion having a substantially U-shaped cross section with an open side and including first and second substantially parallel sides adapted to be forced onto said substantially normal to said open side, said sleeve portion further having an inner surface at least partially defined by said first and second substantially parallel and substantially planar sides, said sleeve being substantially rigid but permitting elastic deformation sufficient to allow said open side to slightly widen as said sleeve is forced onto said main body portion;

whereby said removable member is removable as a unit for transfer to another hand tool and is adapted to attach and detach to said main body portion without interfering with said power supply.

7. The removable member of claim 6, wherein said gripping portion is permanently affixed to said sleeve portion.

8. The removable member of claim 6, wherein said sleeve member is metal.

9. A handle assembly for a hand tool of the type having a trigger actuated motor, said handle assembly comprising:

a main body portion having an upper end and a lower end and substantially parallel and substantially planar sides, said lower end adapted for communication with a power supply;

a removable member adapted to removably attach to said main body portion, said removable member including a gripping portion formed from a first material and adapted to receive a hand of a specific user, and a substantially rigid sleeve portion formed from a second, different material and having a substantially U-shaped cross section with an open side and including first and second substantially planar and substantially parallel sides adapted to be forced onto said substantially parallel and substantially planar sides of said main body portion in a direction substantially normal to said open side, said sleeve portion further having an inner surface at least partially defined by said first and second substantially parallel sides;

a bracket attached to said main body portion;

an elongated trigger including an upper end and a lower end, said trigger adapted to receive a plurality of fingers of said hand and being interdisposed between said first and second sides of said sleeve portion, said trigger being operable to actuate said motor when said lower end of said trigger is pivoted toward said handle assembly and inoperable to actuate said motor when said upper end of said trigger is pivoted toward said handle assembly; and a pin pivotally mounting said elongated trigger to said bracket, said pin being disposed below the index finger of said hand when said gripping portion receives said hand such that said motor can be actuated without use of the index finger;

whereby said removable member is removable as a unit for transfer to another hand tool and is adapted to attach and detach to said main body portion without interfering with said power supply.

10. A handle assembly for a hand tool of the type having a trigger actuated motor, said handle assembly comprising:

a main body portion having an upper end and a lower end and substantially parallel and substantially planar sides, said lower end adapted for communication with a power supply;

a removable member adapted to removably attach to said main body portion, said removable member including a gripping portion formed from a first material and adapted to receive a hand of a specific user, and a substantially rigid sleeve portion formed from a second, different material and having a substantially U-shaped cross section with an open side and including first and second substantially planar and substantially parallel sides adapted to be forced onto said substantially parallel and substantially planar sides of said main body portion in a direction substantially normal to said open side, said sleeve portion further having an inner surface at least partially defined by said first and second substantially parallel sides; and an elongated trigger interdisposed between said first and second sides of said sleeve portion;

whereby said removable member is removable as a unit for transfer to another hand tool and is adapted to attach and detach to said main body portion without interfering with said power supply.

11. The handle assembly of claim 10, further comprising:

a bracket attached to said main body portion; and a pin pivotally mounting said elongated trigger to said main body portion.

12. The handle assembly of claim 11, wherein said pin is disposed below the index finger of said hand when said gripping portion receives said hand.

13. The handle assembly of claim 10, wherein said sleeve portion is metal.

* * * * *